May 7, 1963  J. L. MERRITT  3,088,329
MANUAL TRANSMISSION GEAR SHIFT CONTROLS FOR SPEED SHIFTING
Filed Sept. 22, 1961  2 Sheets-Sheet 1
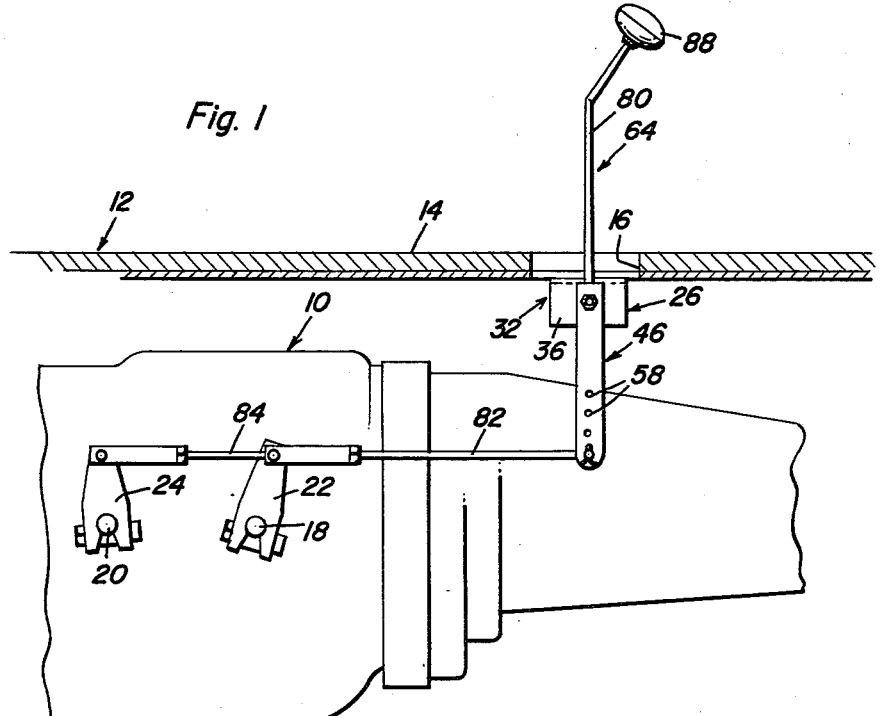
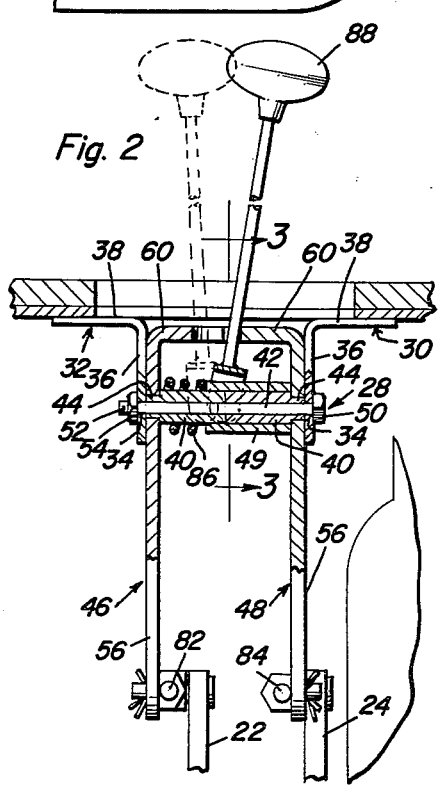
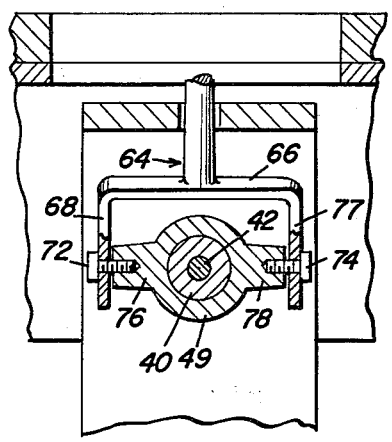
Jimmie L. Merritt
INVENTOR.
BY Clarence A. O'Brien
and Harvey B. Jacobson
Attorneys May 7, 1963   J. L. MERRITT   3,088,329
MANUAL TRANSMISSION GEAR SHIFT CONTROLS FOR SPEED SHIFTING
Filed Sept. 22, 1961   2 Sheets-Sheet 2

Jimmie L. Merritt
INVENTOR.

United States Patent Office 3,088,329
Patented May 7, 1963

3,088,329
MANUAL TRANSMISSION GEAR SHIFT CONTROLS FOR SPEED SHIFTING
Jimmie L. Merritt, Rte. 4, Box 924, Springfield, Mo.
Filed Sept. 22, 1961, Ser. No. 140,020
7 Claims. (Cl. 74—473)

This invention relates to a novel and useful gear shift control for a manual transmission of the type employing a pair of movable actuators each movable between two gear positions and a neutral position therebetween.

In recent years most automotive manual type transmissions have been provided with steering column shift levers and the mounting of a shift lever on the steering column of a vehicle places the shift lever in a position which is undesirable for speed shifting. The older type of floor mounted shift levers are more desirable for speed shifting inasmuch as the H shift pattern on most gear shift levers is easier to follow rapidly with a floor type shift lever.

Accordingly, it is the main object of this invention to provide a floor-type manual transmission gear shift control for a steering column shift-type transmission whereby the steering column shift-type transmission including shifting shafts projecting outwardly of one side of the transmission case thereof may have a shift lever like that of conventional floor-shift type transmissions, which transmissions are usually provided with an opening in the top thereof through which the lower end of a floor-shift lever projects and is operatively connected to the shifting forks thereof.

A further object of this invention, in accordance with the preceding object is to provide a manual transmission gear shift control which will be easy to mount in existing vehicles and with a minimum of modification to the vehicles.

A still further object of this invention is to provide a manual transmission gear shift control in accordance with the preceding objects and of the type utilizing a floor shift lever which may be used in the conventional manner by persons not interested in speed shifting.

A further object of this invention, in accordance with the immediately preceding object, is to provide a manual transmission gear shift control having a shift lever therefor which may be moved in substantially a straight line when shifting from first to second gear thereby enabling the shift from first to second gear to be carried out very rapidly and without the usual pause for laterally deflecting the free end of the shift lever from one leg of the H pattern to the other leg thereof in the neutral gear position.

A final object to be specifically enumerated herein is to provide a manual transmission gear shift control for speed shifting in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a portion of a vehicle shown with the manual transmission gear shift control of the instant invention mounted from the floor board of the vehicle and operatively connected to the pair of movable actuators of the transmission;

FIGURE 2 is a fragmentary vertical sectional view on somewhat of an enlarged scale and taken substantially upon a plane passing through the gear shift control;

FIGURE 3 is a fragmentary vertical longitudinal sectional view taken substantially upon the plane indicated by the section line 3—3 of FIGURE 2 and on somewhat of an enlarged scale;

Figure 4:
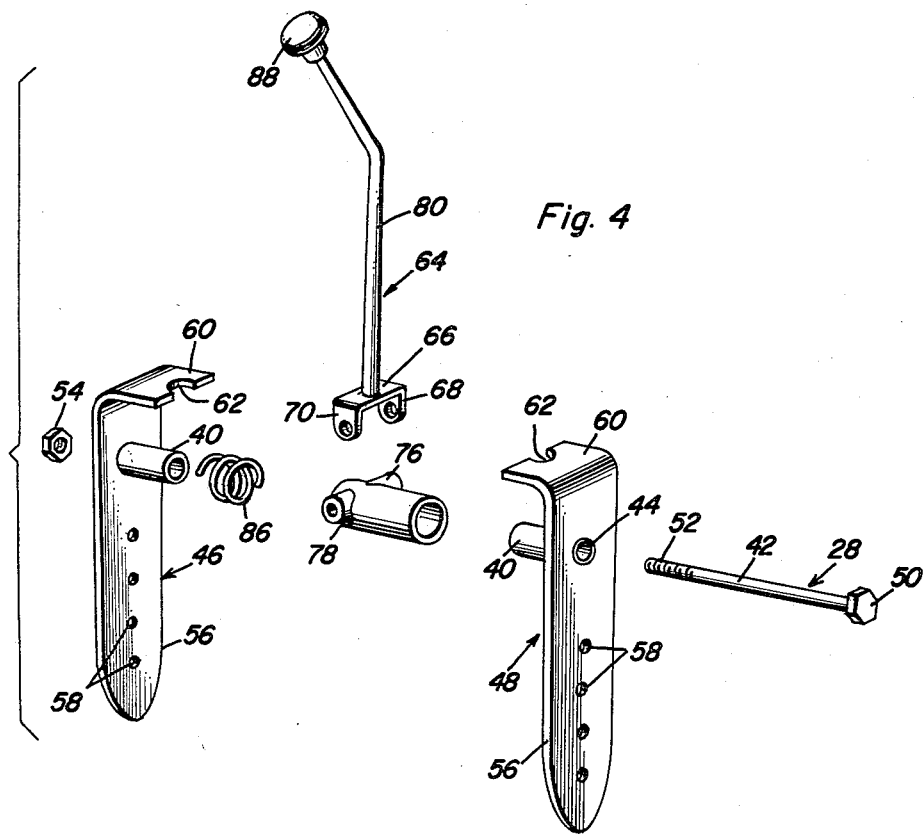
FIGURE 4 is an exploded perspective view of the gear shift control.

Referring now more specifically to the drawings the numeral 10 generally designates a transmission of a conventional vehicle generally referred to by the reference numeral 12 which includes a floorboard 14. It will be noted that the transmission 10 is disposed below the floorboard 14 and that an opening 16 has been formed in the floorboard 14 for a reason which will hereinafter become apparent.

The transmission 10 includes a pair of movable actuators 18 and 20 which each comprise a rotatable shaft which projects outwardly from one side of the transmission and is operatively connected to the gears disposed internally of the transmission 10. Each of the shafts 18 and 20 is operatively connected to the gears of the transmission and may be oscillated between two limit positions to shift the transmission between two gear positions and a neutral gear position disposed therebetween.

The normal transmission gear shift control utilizes a pair of lever arms 22 and 24 which are clampingly secured to the shafts 18 and 20 and are operatively connected to the conventional steering column type of gear shift lever. When moving the conventional steering column gear shift lever through an H pattern from the first gear position to the second gear position, the lever 22 is pivoted from one limit position to the neutral position and then the lever 24 is pivoted from the neutral position to the second gear position. When shifting from second to third, the lever 24 is pivoted from one limit position through the neutral position and to the other limit position. Finally, when it is desired to shift from neutral (when both levers 22 and 24 are disposed in the neutral position) to the reverse gear position, the lever 22 is moved from the neutral gear position to the limit position establishing the reverse gear position while the lever 24 remains in the neutral position.

The manual transmission gear shift control of the instant invention is generally designated by the reference numeral 26 and includes a pivot shaft or fastener generally referred to by the reference numeral 28 which is semi-permanently supported by means of a pair of L-shaped brackets 30 and 32. The pivot shaft 28 is journalled and/or received through the apertures 34 formed in the depending legs 36 of the L-shaped brackets 30 while the horizontal legs 38 of the brackets 30 and 32 are secured to the floorboard 16 in any convenient manner.

A pair of sleeve inserts 40 are disposed about the shank portion 42 of the pivot shaft 28 and are provided with diametrically reduced opposite end portions 44 on which a pair of generally L-shaped shifting levers 46 and 48 are journalled. The confronting ends of the sleeve inserts 40 abut each other and a sleeve 49 is rotatably and slidably mounted on the sleeve inserts 40. The pivot shaft 28 includes a head portion 50 and a threaded end portion 52 remote from the head portion 50 on which there is threadedly engaged a nut 54. In this manner, the sleeve 49 and the shifting levers 46 and 48 are pivotally mounted for rotation about the longitudinal axis of the shank portion 42 of the pivot shaft 28.

Each of the shifting levers 46 and 48 includes a depending arm 56 which is suitably apertured as at 58 at points spaced longitudinally along its lowermost end and the upper end of each arm 56 terminates in a laterally directed flange 60. The flanges 60 project toward each other, terminate adjacent and are registrable with each other and each includes a recess 62. The recesses 62 open toward each other and it will be noted that the lower end of a shift lever arm generally referred to by the reference numeral 64 is bifurcated as at 66 and includes a pair of apertured furcations 68 and 70 by which the lever arm 64 is pivotally secured to the sleeve 49 for rotation about an axis extending transversely of the sleeve 49 and by means of fasteners 72 and 74 secured through the furcations 68 and 70 and threadedly engaged in the mounting bosses 76 and 78 respectively carried by opposite sides of the sleeve 49. It will be noted that the shank portion 80 of the shift lever 64 may be completely received in a selected one of the recesses 62 and that the free ends of the flanges 60 terminate closely adjacent each other and are registrable with each other. In addition, it is to be understood that oscillatory movement of one shifting lever relative to the other shifting lever when each are connected to the lever arms 22 and 24 will be limited to the extent that the recess of the moving lever will not be moved out of alinement with the flange of the other shifting lever.

A pair of adjustable tie rods 82 and 84 operatively connect the lower ends of the arms 56 of the shifting levers 46 and 48 to the lever arms 22 and 24. In this manner, oscillatory movement of the shifting levers 46 and 48 will effect oscillation of the lever arms 24 and 22 respectively.

It will be noted that a compression spring 86 encircles one of the sleeve inserts 40 and is disposed between the confronting surfaces of the shifting lever 46 and the adjacent end of the sleeve 49. In this manner, the sleeve 49 is normally resiliently urged to the limit position illustrated in FIGURE 2 of the drawings. However, the sleeve 49 may be axially displaced to the left as viewed in FIGURE 2 of the drawings by applying pressure to the right on the knob 88 carried by the upper end of the shank portion 80 of the shift lever arm 64.

Figure 5:
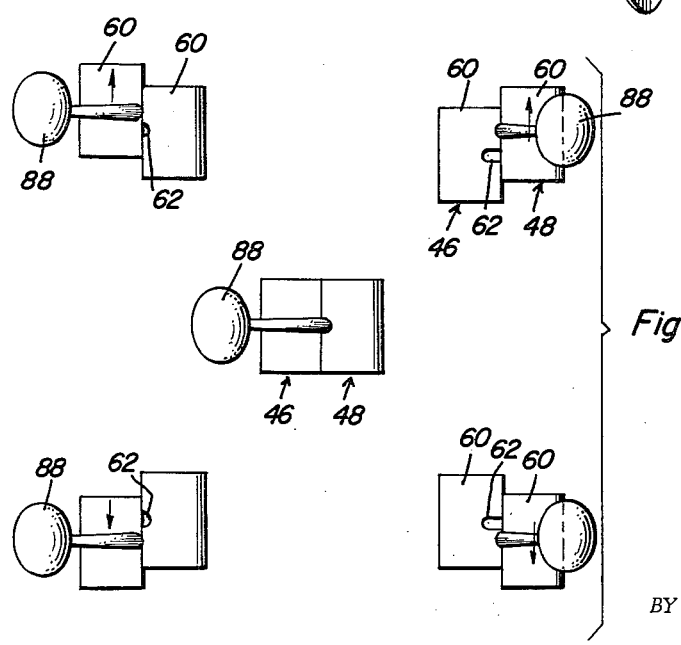
FIGURE 5 is a grouped top plan view illustrating the positions of the manual transmission gear shift control in first gear, second gear, third gear, reverse gear and neutral gear positions and with the individual views positioned relative to each other to depict the five gear shift positions of the conventional H-type of gear shift control pattern.

With attention now directed to FIGURE 5 of the drawings it will be noted that the upper left hand view designates the reverse gear position and it will be noted that the knob 88 has been shifted to the left and received in the recess 62 formed in the shifting lever 46. Then, the knob 88 has been pushed upwardly to pivot the lower end of the shifting lever 56 rearwardly in order to rotate the shaft 18 in a clockwise direction as viewed in FIGURE 1 from the neutral position to the reverse gear position. When it is desired to shift from reverse gear position to first gear position, it is merely necessary to maintain a slight pressure to the left on the knob 88 as viewed in FIGURE 5 of the drawings and then pull the lever straight back wherein the lever arm 22 will be pivoted in a counterclockwise direction to the first gear position and past its neutral position. If it is then desired to place the transmission 10 in neutral, the knob 88 may be pushed upwardly from the lower left hand position illustrated in FIGURE 5 until the recesses 62 are registered with each other as illustrated in the center view in FIGURE 5. Inasmuch as the knob 88 may be freely laterally displaced from one side to another as viewed in FIGURE 2, the shank portion 80 of the shift lever arm 64 may readily be actuated in the normal manner to traverse the H shaped shift pattern depicted in FIGURE 5. Accordingly, when it is desired to shift the transmission 10 to the second gear position the knob 88 is pushed to the right as viewed in FIGURES 2 and 5 of the drawings and then upwardly as viewed in FIGURE 5. Then, after achieving the second gear position as illustrated in the upper right hand view of FIGURE 5, if it is desired to shift to the third gear position, the knob 88 may be urged slightly to the right as viewed in FIGURE 5 and pulled straight downwardly whereupon the lever arm 24 will be pivoted in a counterclockwise direction past the neutral position and into the third gear position.

If it is desired to speed shift from between the first gear position illustrated in the lower left hand view of FIGURE 5 to the second gear position illustrated in the upper right hand view in FIGURE 5 and through the neutral gear position illustrated in the center of FIGURE 5, the gear shift knob 88 may be pushed to the right while the shift lever arm 64 is in the first gear position illustrated in the lower left hand view in FIGURE 5 with sufficient force to axially compress the compression spring 86. Then, the free end of the flange 60 carried by the shifting lever 48 will serve as a fulcrum point for the shift lever arm 64. While maintaining a thrust on the knob 88 to the right as viewed in FIGURES 2 and 5 of the drawings, the transmission 10 may be rapidly shifted from the first gear position to the second gear position merely by moving the knob 88 straight forward while maintaining pressure on the knob to urge it to the right which will, as the recesses 62 register with each other, enable the compression spring 86 to laterally displace the bifurcated end 66 of the shift lever arm 64 to the right and thus retract the shank portion 80 from seated engagement within the recess 62 carried by the shifting lever 46 and into seated engagement within the recess 62 carried by the shifting lever 48. In this manner, the rapid disengagement of the shank portion 80 from the shifting lever 46 to the shifting lever 48 may be obtained while moving the knob 88 in a substantially straight line direction. Accordingly, it may be seen that the shift from the second gear position illustrated in the lower left hand view in FIGURE 5 to the second gear position illustrated in the upper hand view of FIGURE 5 may be rapidly carried out.

However, as previously set forth the gear shift control 26 is constructed in a manner whereby a person unfamiliar with speed shifting controls but familiar with the conventional type of floor gear shift utilizing an H-type shifting pattern may readily operate the gear shift control of the instant invention without ever realizing that it has been specifically designed for speed shifting.

It will be noted that the plurality of apertures 58 in the lower arms 56 of the shifting levers 46 and 48 will enable the throw of the shifting levers 46 and 48 to effect varied amounts of throw on the lever arms 22 and 24 whereby the control 26 may be readily adjusted in order that the maximum oscillation of one of the lever arms 22 and 24 relative to the other lever arm when in the neutral position will not be capable of moving the corresponding recess 62 out of registry with the flange 60 of the other shifting lever.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A floor-type manual transmission gear shift control for a steering column shift-type transmission employing a pair of movable actuators each movable between two gears positions and a neutral position therebetween, said gear shift control comprising a pivot shaft adapted to be semi-permanently supported in a vehicle in which said transmission is disposed and adjacent the driver's compartment of said vehicle, a pair of shifting levers pivotally mounted at points spaced intermediate their opposite ends on said pivot shaft at points spaced longitudinally therealong and including corresponding end portions which terminate in laterally directed flanges projecting toward, terminating adjacent and registrable with each other, said flanges having endwise opening and confronting recesses formed therein, a sleeve rotatably mounted between said levers for rotation about an axis generally paralleling a line paralleling the axis of rotation of said levers and disposed between the opposite ends of said levers, a shift lever arm pivotally secured at one end to said sleeve for rotation about an axis extending transversely of said sleeve and including a shank portion spaced from said one end completely receivable in either of said recesses, and the ends of said lever arms remote from said flanges including means adapted for operative connection with said actuators for selected movement of each of the latter upon movement of the corresponding one of said lever arms, said sleeve including means mounting said one end of said lever arm for lateral displacement in a direction paralleling said line and between two limit positions, means normally resiliently urging movement of said one end of said arm toward one of said limit positions.

2. The combination of claim 1 wherein said sleeve is rotatably mounted on said pivot shaft.

3. The combination of claim 2 wherein said means mounting said one end of said lever arm to said sleeve includes means mounting said lever arm on said sleeve for rotation about an axis fixed relative to said sleeve, said sleeve being rotatably supported from said pivot shaft and mounted for sliding movement longitudinally thereof between said shifting levers, said levers comprising limit means establishing said limit positions and said yieldable means comprising a coil spring encircling said pivot shaft and disposed between one of said shifting levers and said sleeve.

4. The combination of claim 1 wherein said means adapted for operative connection with said actuators includes means adapted for connection with said actuators at selected points spaced longitudinally along said shifting levers.

5. The combination of claim 1 including bracket means for supporting said pivot shaft and adapted to support said pivot shaft adjacent and from the floor of the driver's compartment of said vehicle.

6. A floor-type manual transmission gear shift control for a steering column shift-type transmission employing a pair of movable actuators each movable between two gear positions and a neutral position therebetween, said gear shift control comprising a pivot shaft adapted to be semi-permanently supported in a vehicle in which said transmission is disposed and adjacent the driver's compartment of said vehicle, a pair of shifting levers pivotally mounted at points spaced intermediate their opposite ends on said pivot shaft at points spaced longitudinally therealong and including corresponding end portions which terminate in laterally directed flanges projecting toward, terminating adjacent and registrable with each other, said flanges having endwise opening and confronting recesses formed therein, a sleeve rotatably mounted between said levers for rotation about an axis generally paralleling a line paralleling the axis of rotation of said levers and disposed between the opposite ends of said levers, a shift lever arm pivotally secured at one end to said sleeve for rotation about an axis extending transversely of said sleeve and including a shank portion spaced from said one end completely receivable in either of said recesses, and the ends of said lever arms remote from said flanges including means adapted for operative connection with said actuators for selected movement of each of the latter upon movement of the corresponding one of said lever arms, said sleeve including means mounting said one end of said lever arm for lateral displacement in a direction paralleling said line and between two limit positions, means normally resiliently urging movement of said one end of said arm toward one of said limit positions, said sleeve being rotatably mounted on said pivot shaft, said means mounting said one end of said lever arm to said sleeve including means mounting said lever arm on said sleeve for rotation about an axis fixed relative to said sleeve, said sleeve being rotatably supported from said pivot shaft and mounted for sliding movement longitudinally thereof between said shifting levers, said levers comprising limit means establishing said limit positions and said yieldable means comprising a coil spring encircling said pivot shaft and disposed between one of said shifting levers and said sleeve, said means adapted for operative connection with said actuators including means adapted for connection with said actuators at selected points spaced longitudinally along said shifting levers.

7. The combination of claim 4 including bracket means for supporting said pivot shaft and adapted to support said pivot shaft adjacent and from the floor of the driver's compartment of said vehicle.

References Cited in the file of this patent

UNITED STATES PATENTS

| | | |
|---|---|---|
| 789,018 | Green | May 2, 1905 |
| 1,970,738 | Collins | Aug. 21, 1934 |
| 2,180,579 | Butzbach | Nov. 21, 1939 |
| 2,357,781 | Randol | Sept. 5, 1944 |
| 2,608,106 | Ritter | Aug. 26, 1952 |
| 3,022,678 | McCordic | Feb. 27, 1962 |
| 3,025,715 | Grady | Mar. 20, 1962 |
| 3,052,135 | Hurst et al. | Sept. 4, 1962 |